DEVICE FOR RELEASABLY CLAMPING A TELEPHONE HANDSET IN A FACSIMILE ACOUSTIC COUPLER

Filed Nov. 25, 1968

INVENTORS
ERNEST J. OKLESHEN
JAN M. FARLOW
by JEFFERS & YOUNG
Attorneys

Nov. 17, 1970 E. J. OKLESHEN ET AL 3,541,261

DEVICE FOR RELEASABLY CLAMPING A TELEPHONE HANDSET
IN A FACSIMILE ACOUSTIC COUPLER

Filed Nov. 25, 1968 3 Sheets-Sheet 2

INVENTORS
ERNEST J. OKLESHEN
JAN M. FARLOW
by JEFFERS & YOUNG
Attorneys

INVENTORS
ERNEST J. OKLESHEN
JAN M. FARLOW
by JEFFERS & YOUNG
Attorneys

United States Patent Office 3,541,261
Patented Nov. 17, 1970

3,541,261

DEVICE FOR RELEASABLY CLAMPING A TELEPHONE HANDSET IN A FACSIMILE ACOUSTIC COUPLER

Ernest J. Okleshen and Jan M. Farlow, Fort Wayne, Ind., assignors to The Magnavox Company, Fort Wayne, Ind., a corporation of Delaware Filed Nov. 25, 1968, Ser. No. 778,510
Int. Cl. H04n *1/04*
U.S. Cl. 179—1 5 Claims

ABSTRACT OF THE DISCLOSURE

A telephone handset is clamped against the transducers of a facsimile acoustic coupler by an arm which is rotated over the handset handle. The arm is attached to a spring loaded shaft which, in the clamped position, exerts a predetermined amount of pressure on the handset and the coupler transducers. The arm may be adjusted to accept various size handset without a change in clamping pressure.

BACKGROUND OF THE INVENTION

Our invention relates to a device for releasably clamping a telephone handset, and particularly to such a device for releasably clamping a telephone handset to the acoustic transducers of a facsimile acoustic coupler with the desired selected pressure.

Facsimile systems are used in business, industry, and other activities to scan a paper or document at one location and transmit electrical signals to a remote location where the scanned paper or document is reproduced. Some facsimile systems are designed to be used with an ordinary telephone handset. A person who wants to send or receive a document by a facsimile system can use his telephone to call the desired distant person. After the call is established, the persons at both ends connect their facsimile machines to their telephone handsets through respective acoustic couplers. Each acoustic coupler provides a two-way acoustic or audible link or coupling between a facsimile machine and a telephone handset, so that permanent or wired connections do not have to be made between the facsimile machine and the telephone lines. Such an acoustic coupler makes the facsimile machine much more useful and versatile, since the machine can be carried from one location to another and easily connected by an acoustic coupler to a telephone handset, which in turn may be connected to any other telephone at any other location. However, because the connection from the telephone handset to the facsimile machine uses an acoustic link whose transfer response and coupling efficiency affect the overall the overall transfer characteristics of a facsimile system, it is desirable, and in some cases essential, that the coupling characteristics be predictable and uniform between different acoustic couplers of the same type. Generally, the transducers of the coupler comprise a microphone and an earphone type reproducer which are respectively coupled through an acoustic chamber to the telephone earpiece or receiver and its mouthpiece or transmitter. The coupler transducers are housed in a suitable soft material, such as a rubber or the like, so as to porvide a resilient receiving cushion for the telephone earpiece and mouthpiece. An acoustic chamber is thus formed between the coupler transducers and the respective handset transmitter and receiver. The chambers are sealed by the pressure of the handset against the resilient material. The telephone handset should bep ressed against this resilient material with a desired, selected, and uniform pressure. Variation in this pressure will cause a variation in the transfer response and efficiency of the acoustic coupling. Too small a pressure is especially undesirable since it can result in an insufficient seal and an undesired acoustic leakage of the chamber. Leakage can greatly affect the transfer or frequency response of the coupling. Excessive pressure can, under certain conditions, cause temporary or even permanent mechanical distortion to the coupler transducers or the handset elements and affect the coupling transfer response. Variations in pressure can also result in variations in the acoustic chamber volume as well as variations in the acoustic loading of the coupler and handset elements. To a lesser degree, these variations affect transfer response and coupling efficiency. In addition, proper sealing tends to reduce sensitivity of the coupler and handset to undesired extraneous acoustic signals or noise. A selected and uniform pressure is therefore desired, and we have found that with one particular type of acoustic coupler and facsimile equipment, a pressure between two and three pounds is most desirable for optimum facsimile and coupler performance and uniformity between different acoustic couplers of the same type. The clamping device should be easily and rapidly operated, perferably with one hand.

Accordingly, an object of our invention is to provide a new and improved device for clamping a telephone handset to the acoustic transducers of a facsimile acoustic coupler.

Another object of our invention is to provide a new and improved device for clamping a telephone handset to the acoustic transducers of a facsimile acoustic coupler, the clamping device being easily and rapidly operated with one hand.

Another object of our invention is to provide an improved device for clamping a telephone handset in a facsimile system acoustic coupler with a desired selected pressure.

Persons familiar with the facsimile system art have recognized the problems pointed out above, and have attempted to provide devices for clamping a telephone handset in an acoustic coupler. However, the clamping devices that have been provided have not had means for adjusting the devices to accommodate various sizes and shapes of telephone handsets. There are, at least in the United States, a wide variety of telephone handsets, each of which may have a different size or shape. Prior clamping devices for acoustic couplers have not had adjustment means to accommodate the various sizes of the telephone handsets without affecting the perssure exerted between the handset and coupler transducers.

Accordingly, another object of our invention is to provide an improved clamping device for acoustic couplers that has a means for adjusting the device to accept various sizes and shapes of telephone handsets while always maintaining a desired and selected clamping pressure.

SUMMARY OF THE INVENTION

Briefly, these and other objects are achieved in accordance with our invention by providing a clamping device on an acoustic coupler. The clamping device comprises a bearing having a cylindrical hole for receiving a shaft. The bearing has a cam surface which is engaged by a cam follower on the shaft. A spring is provided to urge the shaft in a direction that presses the cam follower against the cam surface. An arm is positioned at one end of the shaft at a selected location with respect to the telephone handset. The cam surface causes the arm to raise and clear the edge of the handset handle as the arm is rotated toward the handset. In the final clamping position of the arm over the handset handle, the cam surface is disengaged from the follower and causes the spring loaded shaft and arm to urge the handset against the transducers of the acoustic coupler with the pressure developed by the spring. Thus, our device clamps the handset to the acoustic transducers with the desired selected pressure. If a telephone handset of a different size or shape is used, the arm can be easily adjusted up or down on the shaft to accommodate the different handset heights and still provide the desired selected pressure.

BRIEF DESCRIPTION OF THE DRAWING

The subject matter which we regard as our invention is particularly pointed out and distinctly claimed in the claims. The structure and operation of our invention, together with further objects and advantages, may be better understood from the following description given in connection with the accompanying drawing, in which:

DESCRIPTION OF THE PREFERRED EMBODIMENT

Figure 1:
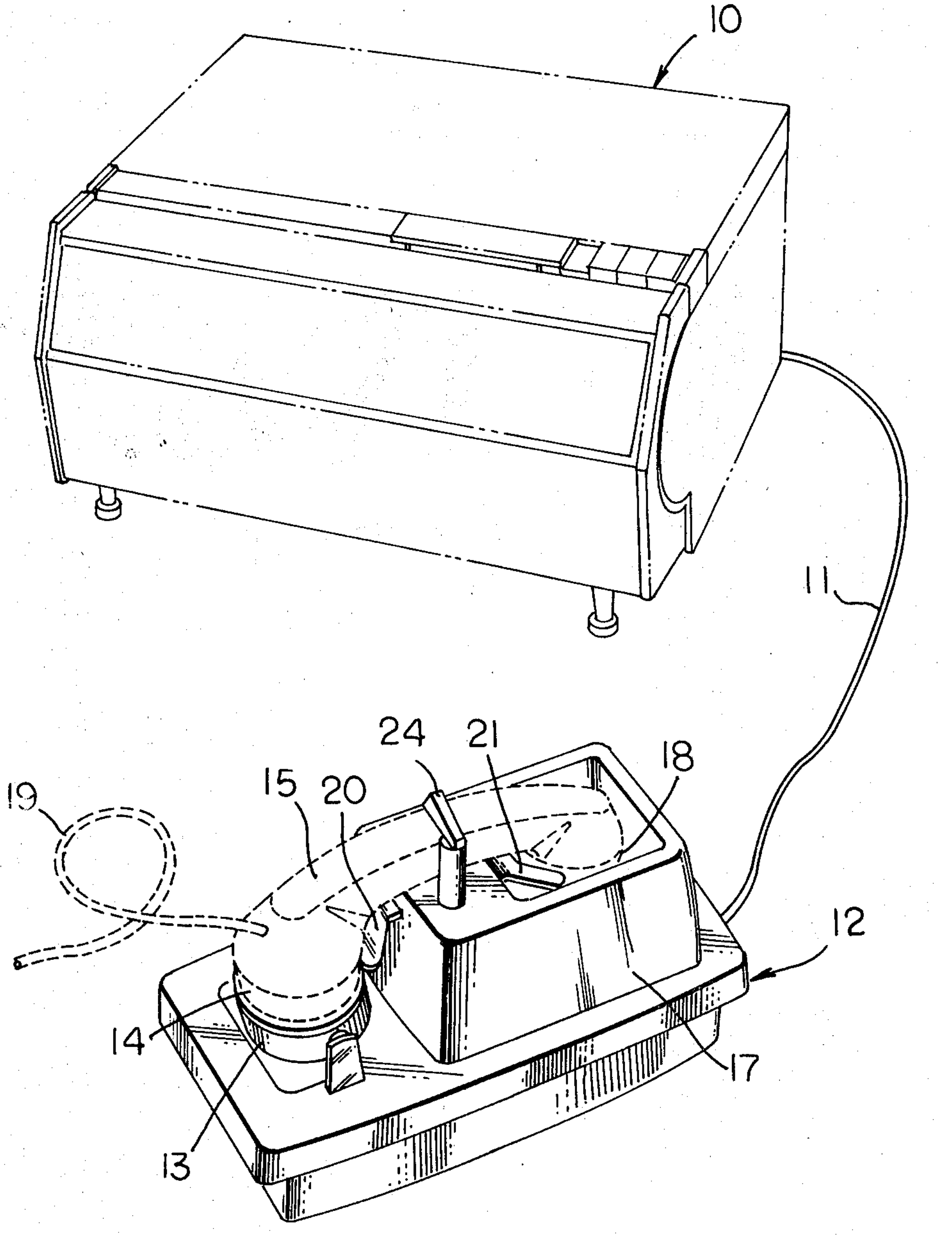
FIG. 1 shows a perspective view of a facsimile machine, an acoustic coupler, and a telephone handset with which our improved clamping device can be used.

In FIG. 1, we have shown a perspective view of a facsimile machine 10 connected by an electrical cable 11 to an acoustic coupler 12. The facsimile machine 10 comprises apparatus for scanning a document and producing electrical signals, or for receiving electrical signals and reproducing a document. The acoustic coupler 12 has a reproducer 13 which transforms electrical signals into audible tones that are coupled to the mouthpiece or transmitter 14 of a telephone handset 15. The acoustic coupler 12 also has a microphone 16 (not visible in FIG. 1) positioned in a sound insulating wall structure 17 which transforms audible signals from the earpiece or receiver 18 of the handset 15 into electrical signals. The telephone handset 15 is connected through a cable 19 to the remainder of the telephone (not shown), which in turn can be connected through a telephone system to any other telephone handset. Such other telephone handset can be provided with an acoustic coupler 12 and a facsimile machine 10 for operation with the apparatus shown in FIG. 1. The acoustic coupler 12 is also provided with adjustable positioning brackets 20, 21 which fit between the mouthpiece 15 and the earpiece 18 to properly position the handset 15. Various handsets can be accommodated by making the spacing between the coupler microphone 16 and reproducer 13 adjustable. The acoustic coupler 12 is also provided with a rotatable arm or handle 24 which, in accordance with our invention, can be adjusted to provide the desired selected pressure against the handset 15; so that the mouthpiece 14 is pressed against the reproducer 13 and the earpiece 18 is pressed against the microphone 16 with a predetermined pressure as desired.

Figure 2:
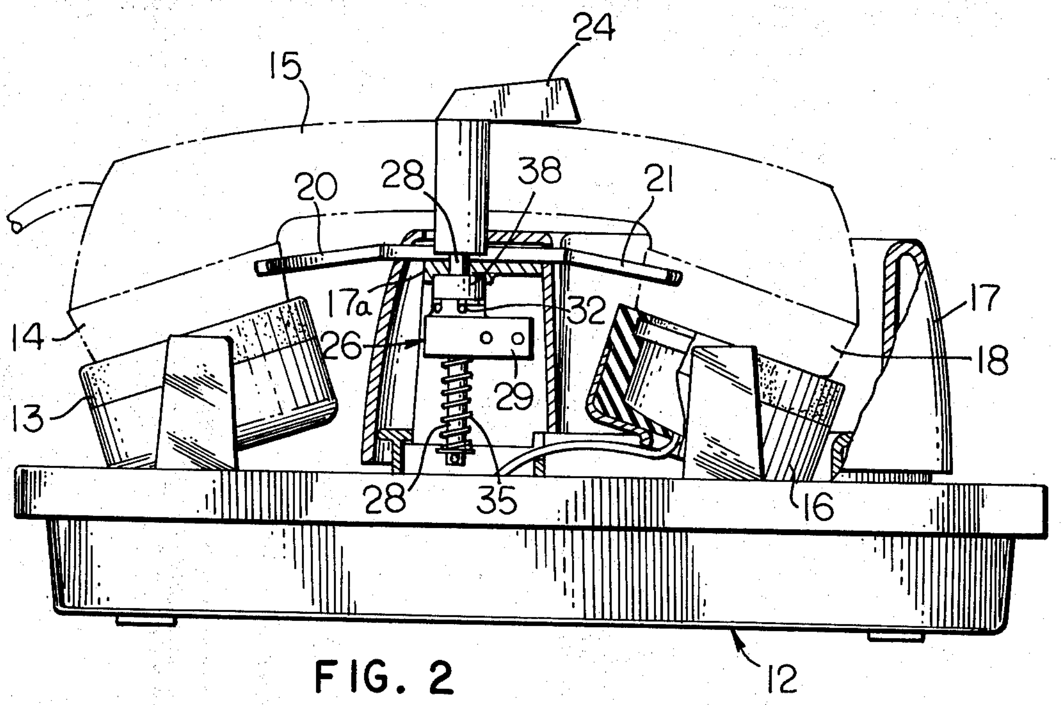
FIG. 2 shows a side elevation view, partly in cross section, of an acoustic coupler having an improved clamping device in accordance with our invention.
Figure 3:
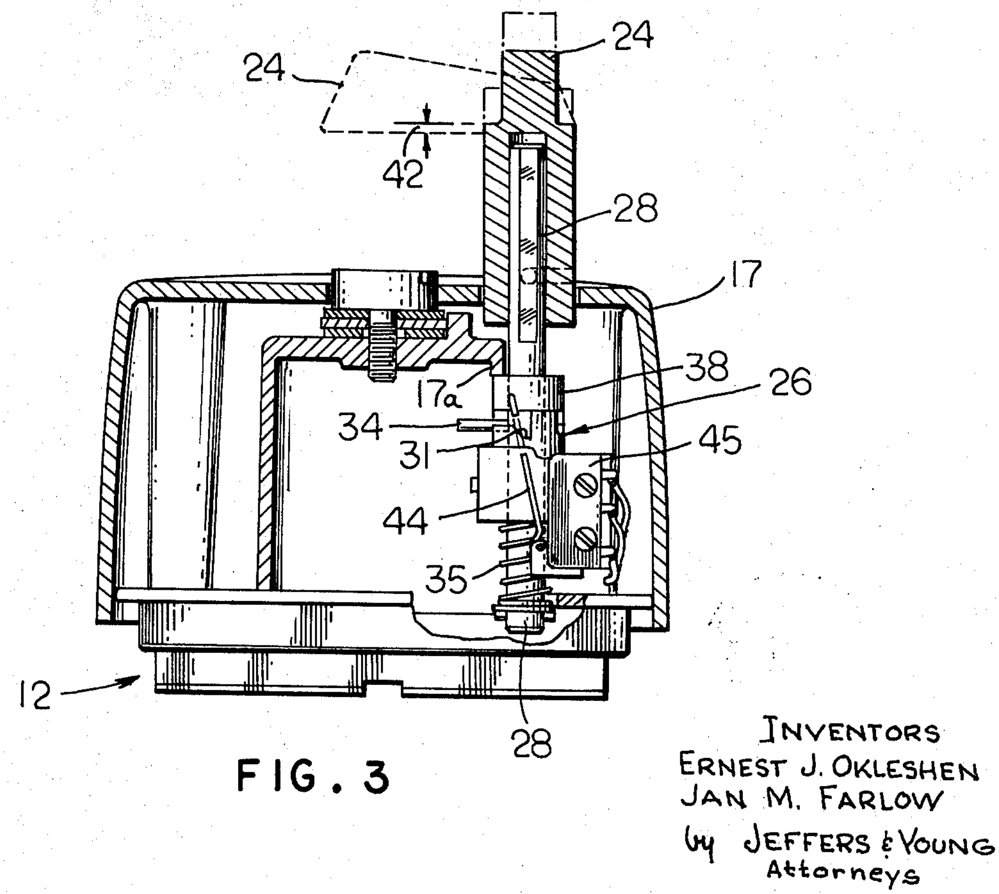
FIG. 3 shows an end elevation view, partly in cross section, of the acoustic coupler and clamping device of FIG. 2.
Figure 4:
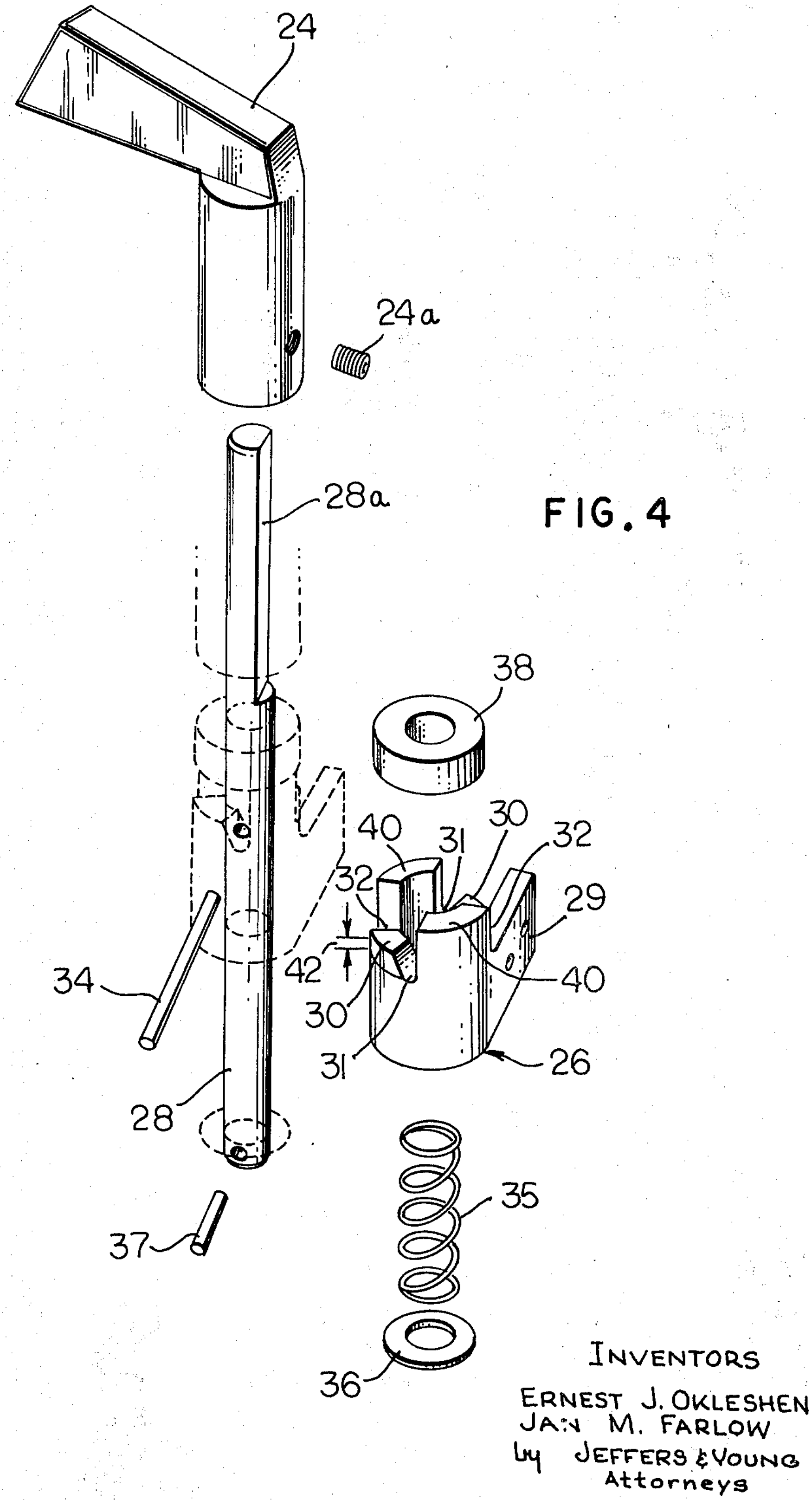
FIG. 4 shows an exploded perspective view of the improved clamping device used on the acoustic coupler of FIGS. 2 and 3.

With reference to FIGS. 2, 3, and 4, we have shown two elevation views of the coupler 12 utilizing our improved device, and an exploded perspective view of the clamping device itself. The clamping device comprises a bearing 26, of metal or other suitable material, having a cylindrical hole 27 for receiving a cylindrical shaft 28, of metal or other suitable material. The bearing 26 is attached by means of a plate 29 to an appropriate part of the wall structure 17 so that the cylindrical hole 27 is vertically oriented. The bearing 26 includes a cam surface having at least one elevated surface 30, and at least a first depressed surface or depression 31, as shown in FIG. 4. We also prefer that the cam surface have a second depressed surface or depression 32 spaced ninety degrees along an arc from the first depressed surface 31. The lower portion of the second surface 32 need not be as low as the lower portion of the first depressed surface 31 for reasons that will be later apparent. Two upper surfaces 40 are also provided for supporting a shaft spacer 38. We prefer that there be diametrical pairs of each of the surfaces 30, 31, 32, 40. A cam follower or cam pin 34 extends radially from either or both sides of the shaft 28 for engaging the cam surfaces on the bearing 26. The shaft 28 is positioned in the hole 27 in the bearing 26, so that the cam pin or follower 34 engages the cam surfaces 30, 31, 32. The pin or follower 34 is urged downward by a spring 35 which is compressed between a lower surface of the bearing 26 and a washer 36 that is held on the lower end of the shaft 28 by suitable means such as a pin 37. The spacer 38 is positioned on the shaft 28 and bears on the upper surface 40 and an appropriate portion **17*a* of the wall structure 17 (shown in FIGS. 2 and 3) and captivates the pin 34 within the confines of the cam surfaces 30, 31, 32. The shaft 28 extends upward beyond the spacer 38 and has a flat portion 28*a* for receiving a set screw 24*a* in the arm or handle 24**.

When the height of the arm 24 on shaft 28 is adjusted, the handset 15 is positioned in the acoustic coupler 12 and the brackets 20, 21 are first adjusted. It is assumed that the spacing between the coupler mircrophone 16 and reproducer 13 have been properly adjusted to mate with the particular handset in use. These adjustments insure that the handset 15 will always be properly positioned along the length of the acoustic coupler 12. The shaft 28 is then rotated so that the arm 24 is across the upper portion or handle of the handset 15 as illustrated in FIG. 1. The arm 24 is now loosened from the shaft 28 by loosening the set screw **24*a*. This permits the shaft 28 to move downward until the cam pin 34 is seated in the lower depressed surface 31, and the shaft 28 is in its lowest position. The arm 24 is now positioned until it just touches the upper part of the handset 15. The arm 24 is finally positioned and locked on the shaft 28 a selected distance (for example $\frac{1}{16}$ of an inch depending upon the exact dimensions of the cam surfaces 30, 31, 32), below the previous position where it just touches the top of the handset 15. The arm 24 may now be rotated ninety degrees so that the cam pin 34 is positioned in the second depressed surface 32, and so that the handset 15 can be removed. Thus, the second depressed surface 32 holds or detents the arm 24 in its open or unclamped position. Other procedures may be used to properly adjust the height of the arm; however, proper adjustment is obtained when, in the final clamped position of the arm 24 over the handset 15 as illustrated by FIG. 1, the follower 34 is not fully bottomed in the depressed cam surface 31. This permits the spring loaded shaft 28 and the arm 24 to urge the handset 15 against the transducers of the acoustic coupler. The desired pressure of the handset against the coupler is determined by the compressed force, in the clamped position, of the particular spring used. When properly adjusted, it is also desired that the arm 24 just clear the edge of the handset handle when the arm is rotated from its unclamped or open position to the clamped position over the handset. Whenever the handset 15 is placed in the acoustic coupler 12, the handle 24 can then be rotated to clamp the handset 15 with the assurance that the pre-selected pressure, as determined by the spring 35, will be provided. If the acoustic coupler 12 is used with another type of handset with different physical dimensions, the same adjustment can be made. FIG. 3 shows the arm 24 in its released position in solid lines, and its downward and clamping position (without handset 15) in dashed lines. The distance that the arm 24 is moved downward when it is rotated ninety degrees from its unclamped to its clamping position is indicated by the length of the arrow 42 and is, in the embodiment described, the difference in depth of cam surfaces 31 and 32**.

It will thus be seen that our invention provides a new and improved clamping device for an acoustic coupler for a facsimile system. Our clamping device is relatively simple, but permits the device to be adjusted to accommodate a wide variety of handsets, and still provide the same holding pressure for any of such type handsets. While we have shown only one embodiment of our invention, persons skilled in the art will appreciate that modifications may be made. For example, with respect to FIG. 3, the cam pin 34 may be used to actuate the switch arm 44 of a microswitch 45 to provide various electrical functions when the handset 15 is clamped in position. Also, the cam surface on the bearing 26 may have various configurations. For example, the depression 32 may be omitted and surfaces 30 and 32 combined in a single incline or flat surface, although we prefer that the cam surface have at least the depressed surface 31 and the depressed surface 32 preferably spaced ninety degrees along an arc. Further, the spring 35 may have various configurations, and the position of the bottom of the spring 35 may be made adjustable on the shaft 28 to vary the spring pressure and thus the clamping pressure as may be desired. The spacer 38 may also be omitted and excessive upward movement of the shaft 28 and follower 37 limited by other means. For example, these means may include a hollow bushing mounted coaxially outside of shaft 28 and inside or outside of spring 35 between the lower portion or surface of bearing 26 and the upper surface of washer 36. The bushing would have a length such as to stop or restrict upward movement of the follower pin 34 beyond the cam surface 40. Therefore, while our invention has been described with reference to a particular embodiment, it is to be understood that modifications may be made without departing from the spirit of the invention or from the scope of the claims.

What we claim as new and desire to secure by Letters Patent of the United States is:

1. An improved device for releasably clamping a telephone handset mouthpiece and a telephone handset earpiece with the desired pressure against respective acoustic transducers in an acoustic coupling device for a facsimile transmitter and receiver, said improved clamping device comprising:

(a) a bearing adapted to be mounted on said acoustic coupling device, said bearing having a cylindrical hole therethrough for receiving a shaft and having a cam surface adjacent to and at least partially around said cylindrical hole, said cam surface having at least a first depression and an elevated surface;

(b) a cylindrical shaft rotatably positioned in said cylindrical hole in said bearing;

(c) a cam follower attached to said cylindrical shaft and positioned to engage said cam surface;

(d) an actuating and hold down arm adjustably attached to one end of said shaft for turning said shaft and clamping and releasing a telephone handset;

(e) and resilient mechanical means attached to said shaft for urging said shaft in a direction so that said cam follower is urged toward said cam surface, thereby clamping said arm against a telephone handset with a selected pressure when said cam follower is rotated into said first depression and releasing said telephone handset when said cam follower is rotated out of said first depression.

2. The improved holding device of claim 1 wherein said cam surface further has a second depression spaced from said first depression by said elevated surface.

3. The improved holding device of claim 2 wherein said resilient mechanical means comprise a spring positioned around said shaft near the other end thereof away from said arm to urge said other end of said shaft away from said bearing.

4. The improved holding device of claim 2 wherein said cam follower comprises a pin radially extending from said shaft, and wherein said first and second depressions are arcuately spaced substantially ninety degrees around said cam surface for receiving said cam follower pin.

5. The improved holding device of claim 4 wherein said resilient mechanical means comprise a spring positioned around said shaft near the other end thereof away from said arm to urge said other end of said shaft away from said bearing.

References Cited

UNITED STATES PATENTS

| | | | |
|---|---|---|---|
| 2,547,420 | 4/1951 | Sumner | 179—146 |
| 2,847,506 | 8/1958 | Gray et al. | 179—1 |

KATHLEEN H. CLAFFY, Primary Examiner

D. W. OLMS, Assistant Examiner